Aug. 13, 1935.   A. S. DYSART   2,010,813
MAGNETIC MEANS AND METHOD FOR TESTING WELDED JOINTS
Filed Jan. 11, 1934   2 Sheets-Sheet 1

INVENTOR
Arthur S. Dysart
BY
ATTORNEY

Aug. 13, 1935.　　　　A. S. DYSART　　　　2,010,813
MAGNETIC MEANS AND METHOD FOR TESTING WELDED JOINTS
Filed Jan. 11, 1934　　　2 Sheets-Sheet 2

INVENTOR
*Arthur S. Dysart*
BY
*Howled Dodd*
ATTORNEY

Patented Aug. 13, 1935

2,010,813

UNITED STATES PATENT OFFICE 2,010,813

MAGNETIC MEANS AND METHOD FOR TESTING WELDED JOINTS

Arthur S. Dysart, United States Navy

Application January 11, 1934, Serial No. 706,229

11 Claims. (Cl. 175—183)

(Granted under the act of March 3, 1883, as amended April 30, 1928; 370 O. G. 757)

This invention relates to a device and method for testing the quality of welded joints in magnetic material by comparing the magnetic flux across a weld of unknown quality with the flux across a weld of known quality or a portion of the material itself.

It is the object of this invention to provide a simple, rapid and accurate means for determining by a null method the relative magnetic flux across a weld as compared with the flux across a standard weld.

A further object of this invention is to provide means for making intimate magnetic contact between the device and the surface of the body to be tested by a construction that permits the contacting portions of the magnets to adjust to irregularities on such surface.

With the above and other objects in view, my invention consists in the construction, combination and arrangement of parts as will be more fully hereinafter set forth as shown by the accompanying drawings and finally pointed out in the appended claims.

Reference is to be had to the accompanying drawings forming a part of this specification, in which like reference characters indicate corresponding parts throughout the several views, and in which.

When a magnetic flux passes through magnetic metals, there is what may be termed a "drop of magnetic potential" along the path of the flux, just as there is a drop of electric potential along the path of an electric current. By providing a shunt path around the part being tested and reducing the flux in this path to zero by a measured magnetomotive force, such as is produced by a winding of known ampere turns, we may determine the strength of the original magnetomotive force in the shunt path. This may be called a null method of measurement. I consider it best suited to my purpose as it reduces the effect of air gap reluctance in the magnetic shunt path upon the accuracy of the results.

Figure 1:
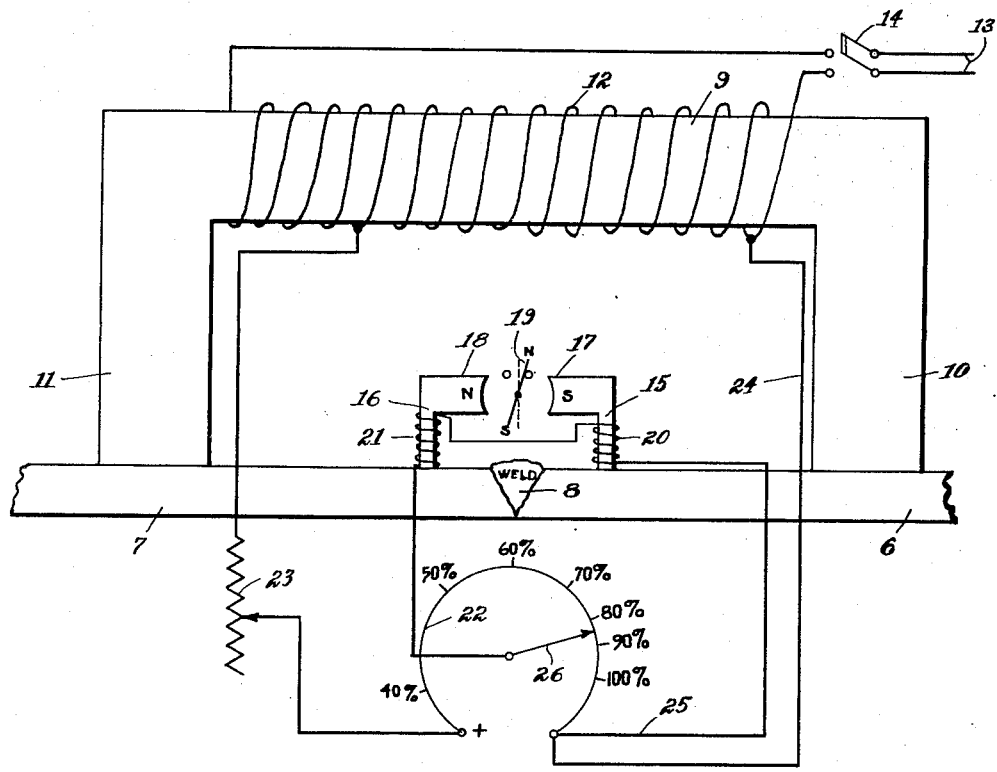
Fig. 1 is a schematic assembly view of one embodiment of my invention.
Figure 2:
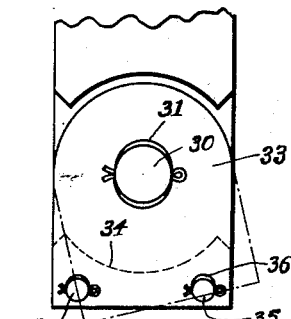
Fig. 2 is a detail side elevation of one of the feet of the magnet.
Figure 3:
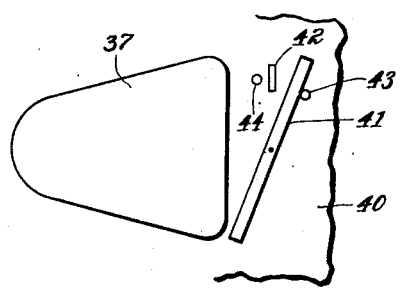
Fig. 3 is a detail top plan view of the means for indicating the resultant flux across the weld.

In Fig. 1 two pieces 6 and 7 of magnetic material are joined by a weld 8 whereof the quality is to be determined. The electromagnet 9 is of sufficient length to bridge the weld and has poles 10 and 11 in contact with the pieces 6 and 7 respectively. The magnetizing winding 12 is supplied with direct current from wires 13, controlled by a switch 14. Disposed within the field of magnet 9 are members 15 and 16 on opposite sides of weld 8 with poles 17 and 18 spaced sufficiently to permit mounting a bar magnet 19 therebetween to execute limited oscillations. It is apparent that a certain portion of the magnetic flux due to magnet 9 will be shunted around the weld 8 through the members 15 and 16, and that the flux through a weld is a function of the quality of the weld and therefore the strength of the flux in the shunt is an index of the quality of the weld. Windings 20 and 21 on the members 15 and 16 respectively are in such sense as to set up between poles 17 and 18 a magnetic flux in opposition to the shunted flux. The terminals of a potential divider 22 are connected to winding 12 through a variable resistance 23 and wire 24 respectively. Winding 20 is connected by wire 25 to the same terminal of the potential divider as is wire 24, while winding 21 is connected to the movable contact arm 26 of the potential divider.

Potential divider 22 is calibrated by setting up, as indicated in Fig. 1, the parts across a weld of known quality in material having magnetic characteristics like that in which the weld to be tested is made and energizing the coil 12, the shunted portion of the flux passing between poles 17 and 18 acting upon pivoted bar magnet 19 causing the bar magnet to be deflected by attraction and repulsion between the poles 17 and 18 and the poles of magnet 19. The arm 26 of the potential divider is then set at the 100 percent mark on the potential divider dial and resistance 23 is adjusted until the magnet 19 reaches a state of unstable equilibrium, the setting of resistance 23 being varied a number of times to make certain that it is correct. The apparatus is then set up in a similar manner across a weld of unknown quality and arm 26 adjusted on the potential divider to cause the magnet 19 to assume a state of unstable equilibrium, the quality of the weld being shown directly by the position of arm 26 on the calibrated dial of the potential divider.

One preferred form of my invention is disclosed in Figs. 2 to 5. Two substantially U-shaped magnets 27 and 28 have their central portions outwardly bowed in opposite directions to provide space for the indicating mechanism and the shunt circuit between such magnets. The contacting feet of the magnetic poles are made up of segments or laminæ capable of a limited degree of movement with respect to each other to permit such feet to adjust to inequalities of the surface of the material being tested and so reduce to a minimum the air gap reluctance at such contacts. The magnets are maintained properly spaced by means of bars 29 and 30 that pass through elongated apertures 31 in the foot segments and hence serve also as pivots for the foot segments permitting both rotatory and longitudinal movement in addition to their spacing function. It will be observed from Figs. 2 and 5 that each foot is made up of two sets of fixed, and two sets of movable laminæ. The laminæ 32 are fixed to the magnets and their free ends have a circularly concave outline, the ends of the laminæ of each set defining a curved surface and these surfaces being spaced from each other longitudinally of the laminæ. The members of one set alternate with those of the other. The two sets of relatively movable laminæ have their upper ends circularly convex and the laminæ are of such lengths that when they are assembled with the fixed laminæ the convexity of the movable ones lying partly in the concavity of the fixed ones the plane free ends of the movable laminæ normally define a substantially plane surface. The laminæ 33 are connected to the fixed laminæ 32 for limited longitudinal and rotational movement by means of pins 30 that extend through oval holes 31 having their major axes disposed longitudinally of the laminæ. Laminæ 34 are held assembled with laminæ 33 by pins 35 extending through oval holes 36 in the laminæ. Thus the movable laminæ may move longitudinally with respect to each other to a limited extent and all are rotatable about pins 30, and due to the elongation of the holes in which pins 30 and 35 are disposed they may move longitudinally with respect to laminæ 32 also. Thus the feet may adjust to irregularities on the surface of the test specimen.

The magnetic shunt circuit comprises two members 37 and 38 that contact the welded material on opposite sides of the weld and are wound as explained in connection with members 15 and 16 in Fig. 1. To prevent inaccuracies arising from stray magnetic fields, these members are inclosed within a magnetic shield 39 having a transverse partition 40 of non-magnetic material therein that serves as a supporting member to hold the elements 37 and 38 in their proper positions and to mount the magnet 41. Between the elements 37 and 38 is a pivoted magnet 41 that rests against stop 44 and covers slit 42 in member 40 when acted on by flux across the air gap in one direction but which swings against stop 43 and uncovers slit 42 when the flux between elements 37 and 38 is reduced to zero and barely reversed in direction. Slot 42 may be made very narrow, so that the swing of pivoted magnet 41 need only be a few thousandths of an inch to cover or uncover slot 42. As the pivoted magnet 41 is made very light in weight a very weak flux suffices to move it, so that although an actual reversal of flux is necessary to move the pivoted magnet 41, this movement occurs almost instantly after the flux passes through zero in either direction. The shield 39 is held in its operative position by means of springs 46 connected thereto and to the magnets 27 and 28.

Figure 4:
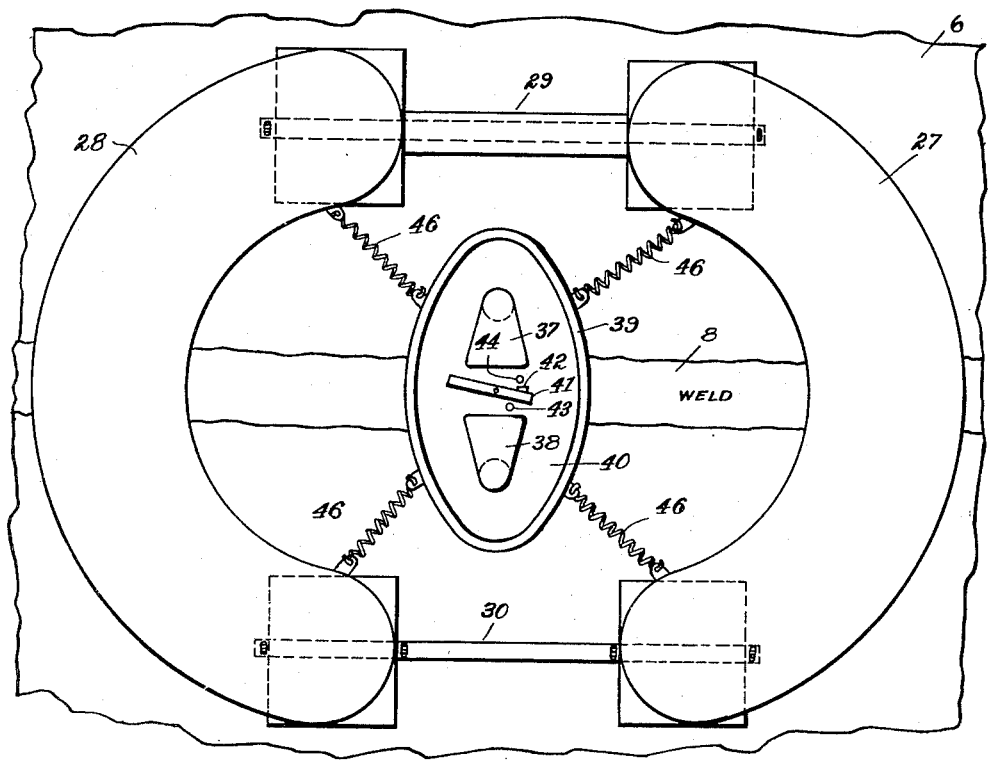
Fig. 4 is a top plan view of my invention wherein two magnets are utilized.
Figure 5:
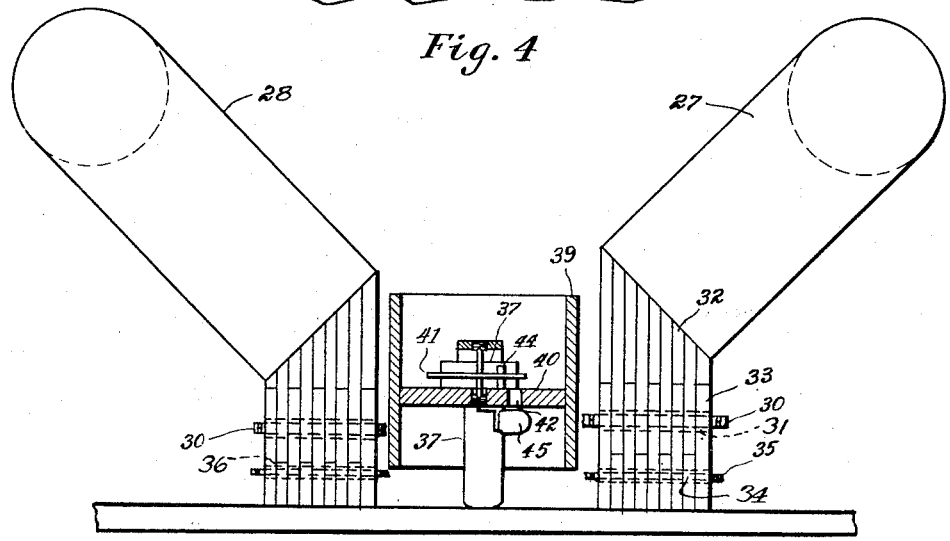
Fig. 5 is an end elevation of the parts shown in Fig. 4 with certain elements shown in vertical section.

The operation of the device is substantially as explained above in connection with Fig. 1, it being understood that the potential divider and variable resistance are connected to the several parts of Figs. 4 and 5 as shown diagrammatically in Fig. 1. The setting up of a flux across the weld causes magnet 41 to be swung aside and make visible through slit 42 the light from lamp 45; the arm 26 of the potential divider is then positioned to set up a slightly greater and opposite flux to bring the magnet 41 to the point at which all light is cut off from slit 42, the slit being of only slightly less width than the magnet 41. The quality of the weld in percent is then read from the dial of the potential divider.

In order to estimate the point of zero flux between members 37 and 38, note the reading of the potential divider the instant slit 42 is covered. Then reverse the motion of potential divider and note the reading the instant slit 42 is uncovered. The mean of the two readings is the point of zero flux. For rapid work a correction is applied to the reading when slit 42 is covered and the corrected reading is taken as the point of zero flux.

It is apparent that the effect of the reluctance of the air gap between members 37 and 38 will be the same upon the neutralizing flux as upon the shunted portion of the flux from magnets 27 and 28 and that therefore but little, if any error will be introduced thereby.

It will be understood that the above description and accompanying drawings comprehend only the general and preferred embodiment of my invention and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalties thereon or therefor.

I claim:

1. Magnetic testing apparatus, comprising two substantially U-shaped electro-magnets disposed with their like poles somewhat spaced from each other, spacing means connecting the said like poles, feet on said poles made up of articulated laminæ; a circuit to supply unidirectional current to each magnet, members forming a shunt magnetic circuit with respect to said magnets, a magnetic shield around said members, a circuit to set up a magnetic field between said members opposed to the field of said magnets including a variable resistance and a calibrated potential divider, a rotatably mounted bar magnet in the field of said members, a member having in it a slit disposed to be covered by said rotatable magnet at one limit of its motion and a source of light back of said last mentioned member adjacent said slit.

2. In a magnetic testing apparatus, a substantially U-shaped electro-magnet, feet on the poles thereof made up of articulated laminæ, a circuit to supply unidirectional current to said magnet, members forming a shunt magnetic circuit with respect to said magnet, a magnetic shield around said members, a circuit to set up a magnetic field between said members opposite to the field of said magnet including a variable resistance and a potential divider, a rotatably mounted bar magnet in the field of said members, a member having in it a slit disposed to be covered by said rotatable magnet at one limit of its motion and a source of light back of said last mentioned member adjacent said slit.

3. In a magnetic testing apparatus, a substantially U-shaped electro-magnet, a circuit to supply unidirectional current to said magnet, members forming a shunt magnetic circuit with respect to said magnet, a magnetic shield around said members, a circuit to set up a magnetic field between said members opposite to the field of said magnet including a variable resistance and a potential divider, a rotatably mounted bar magnet in the field of said members, a member having in it a slit disposed to be covered by said rotatable magnet at one limit of its motion and a source of light back of said last mentioned member adjacent said slit.

4. Magnetic testing apparatus, comprising two substantially U-shaped electro-magnets disposed with their like poles somewhat spaced from each other, spacing means connecting the said like poles, a circuit to supply unidirectional current to each magnet, members forming a shunt magnetic circuit with respect to said magnets, a magnetic shield around said members, a circuit to set up a magnetic field between said members opposed to the field of said magnets including a variable resistance and a calibrated potential divider, a rotatably mounted bar magnet in the field of said members, a member having in it a slit disposed to be covered by said rotatable magnet at one limit of its motion, and a source of light back of said last mentioned member adjacent said slit.

5. Magnetic testing apparatus, comprising two magnets each adapted to bridge a portion of the surface of the material to be tested, means maintaining the like poles of said magnets in fixed spatial relation, a foot formed of laminar segments carried by each pole of each magnet, the said means serving as pivots about which the segments of such feet are movable, members forming a shunt magnetic circuit across a portion of the said surface in the field of said magnets, means for setting up between said members a magnetic field opposed to the field of said magnets, a pivotally mounted bar magnet disposed between said members, a member having in it a slit disposed to be covered by said pivotally mounted magnet at one limit of its motion, a source of light disposed adjacent said slit, a magnetic shield disposed around said members and said pivotally mounted magnet and means to maintain said shield suitably spaced from said first mentioned magnets.

6. Magnetic testing apparatus, comprising means for setting up a principal magnetic flux, other means forming a shunt magnetic circuit to carry a portion of said flux, means for setting up in said other means a magnetomotive force opposed to said portion of the principal flux and means to indicate when said opposing magnetomotive force has suppressed the flux in said shunt magnetic circuit due to said first mentioned means.

7. Magnetic testing apparatus, comprising means to set up magnetic flux through a body to be tested, means constituting a shunt magnetic circuit around a portion of the said body through which said flux is passing, means to set up in said shunt circuit a magnetomotive force opposed to the first mentioned flux and means to indicate the direction of the resultant flux in the shunt circuit.

8. A method of testing the quality of welds, comprising the steps of setting up a magnetic flux in the welded material transversely to the weld, diverting a portion of said flux through a shunt magnetic circuit, setting up in said shunt circuit a magnetomotive force opposed to the first mentioned flux and of strength equal to that of the said diverted portion and comparing the strength of said opposing magnetomotive force in the shunt circuit with a standard.

9. A method of testing the quality of welds, comprising the steps of setting up a magnetic flux in the welded material transversely to the weld, diverting a portion of said flux through a shunt magnetic circuit, neutralizing the said diverted portion and comparing with a standard the force necessary to neutralize said portion.

10. A method of testing the quality of welds, comprising the steps of setting up across a weld of known quality a magnetic flux, diverting a portion of said flux through a shunt magnetic circuit, determining the strength of said diverted portion, then setting up across a weld of unknown quality a magnetic flux of the same strength as the first mentioned flux, diverting a portion of flux across the unknown weld through the same shunt circuit members, neutralizing the second mentioned diverted portion and comparing the strength of the neutralizing flux with the first mentioned diverted portion of the flux.

11. A method of testing the quality of welds, comprising the steps of setting up across a weld of known quality a magnetic flux, diverting a portion of said flux through a shunt magnetic circuit, determining the ampere-turns necessary to neutralize the said diverted portion, setting up across a weld of unknown quality a flux equal to the first mentioned flux, determining the ampere-turns necessary to neutralize the second mentioned diverted portion and comparing the second number of ampere turns with the first mentioned number thereof.

ARTHUR S. DYSART.